Figure 2:
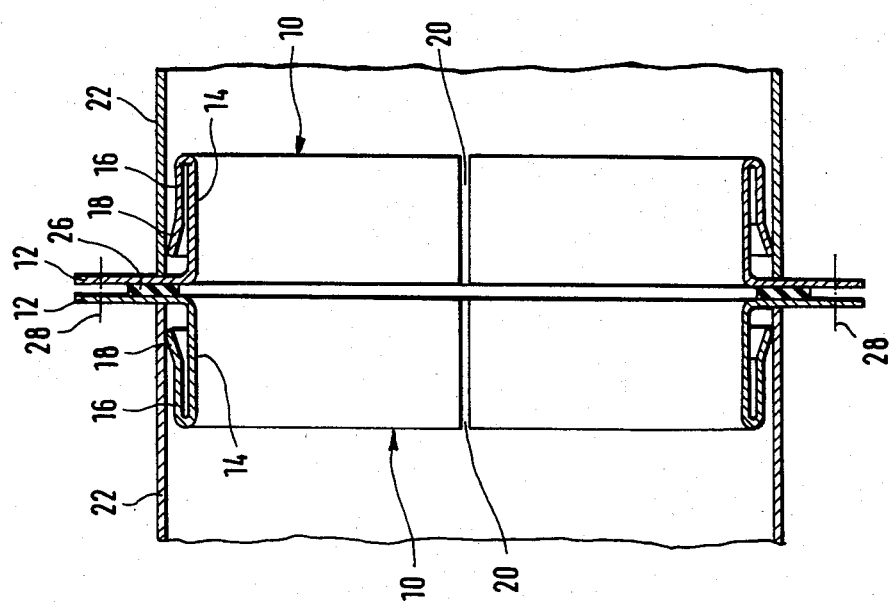

United States Patent [19]

Meinig

[11] Patent Number: 4,516,797
[45] Date of Patent: May 14, 1985

[54] FLANGED RING FOR TUBES

[75] Inventor: Manfred Meinig, Weilheim, Fed. Rep. of Germany

[73] Assignee: Karl Meinig, KG, Weilheim, Fed. Rep. of Germany

[21] Appl. No.: 427,151

[22] Filed: Sep. 29, 1982

[30] Foreign Application Priority Data

Nov. 5, 1981 [DE] Fed. Rep. of Germany ....... 3143893

[51] Int. Cl.³ .................. F16L 23/00; F16L 17/00
[52] U.S. Cl. ........................ 285/405; 285/363; 285/424; 285/DIG. 22
[58] Field of Search ........ 285/363, 424, 405, DIG. 22

[56] References Cited

U.S. PATENT DOCUMENTS

| | | | |
|---|---|---|---|
| 1,165,838 | 12/1915 | Brill | 285/DIG. 22 |
| 3,415,543 | 12/1968 | Keating | 285/424 X |
| 3,479,073 | 11/1969 | Collins | 285/424 X |
| 4,046,409 | 9/1977 | Virgin | 285/DIG. 22 |
| 4,082,322 | 4/1978 | Lever | 285/424 X |
| 4,304,423 | 12/1981 | Mez | 285/DIG. 22 |

FOREIGN PATENT DOCUMENTS 2434160 1/1976 Fed. Rep. of Germany ...... 285/424
481340 12/1969 Switzerland ............... 285/DIG. 22

Primary Examiner—Richard J. Scanlan, Jr.
Attorney, Agent, or Firm—Leonard Bloom

[57] ABSTRACT

In order to produce butt joints between two thin-walled sheet-metal tube sections (22), a one-piece flanged ring (10) is used, which substantially comprises only a securing flange (12) protruding approximately radially outward, an arm (14) projecting from the inner end of the securing flange and a ring land (18) bent obliquely outward toward the securing flange (12) by the arm (14). The outer diameter of the ring land (18) is selected such that when it is driven into the end of the tube, it comes under pre-stressing and thus produces a stable joint between the flanged ring (10) and the tube (22). The invention also encompasses a simple method for producing the flanged ring (10), in which an elongated, flat sheet-metal strip is first folded and then is bent into annular form, and further encompasses a butt joint, having two flanged rings (10) according to the invention, between two thin-walled sheet-metal tube sections (22). Finally, the invention also relates to a reliable fixation of the ends of the flanged ring against one another by means of a clamp (110) which can be mounted onto them.

19 Claims, 17 Drawing Figures

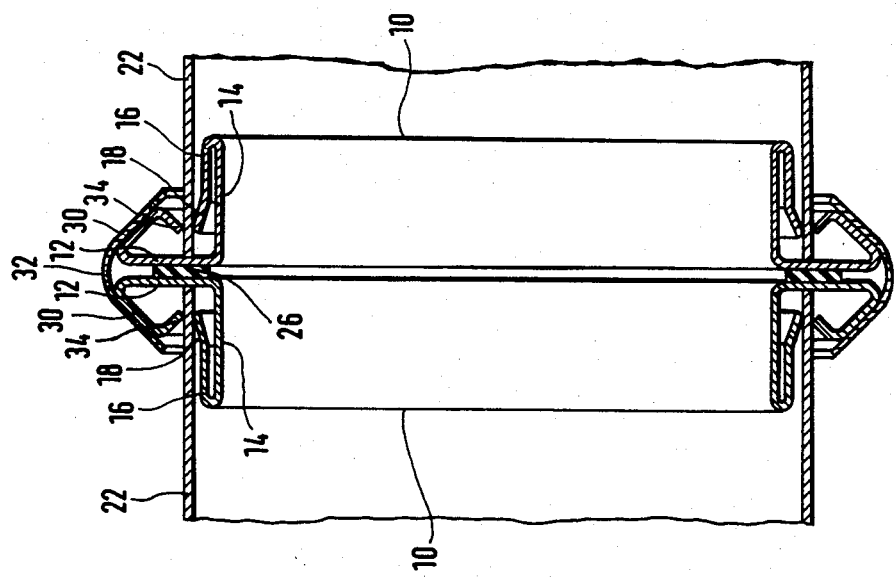
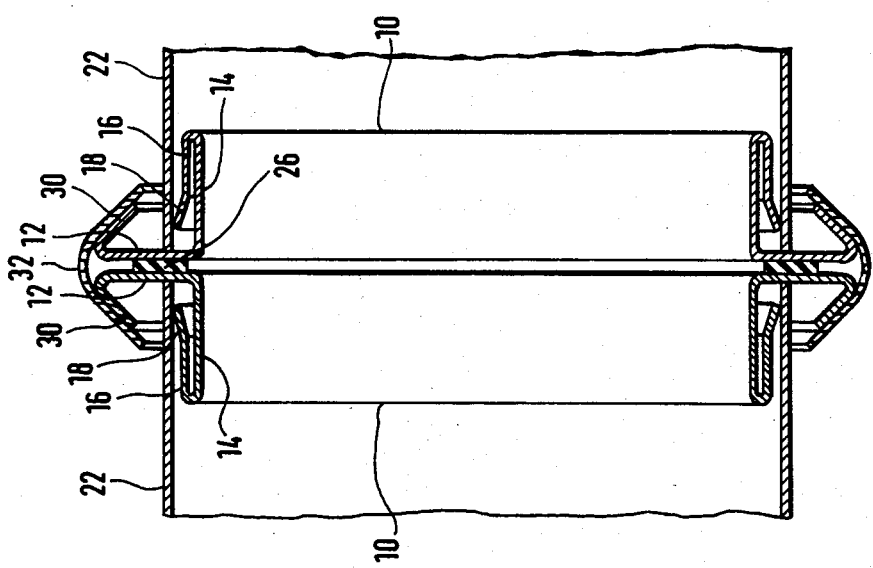

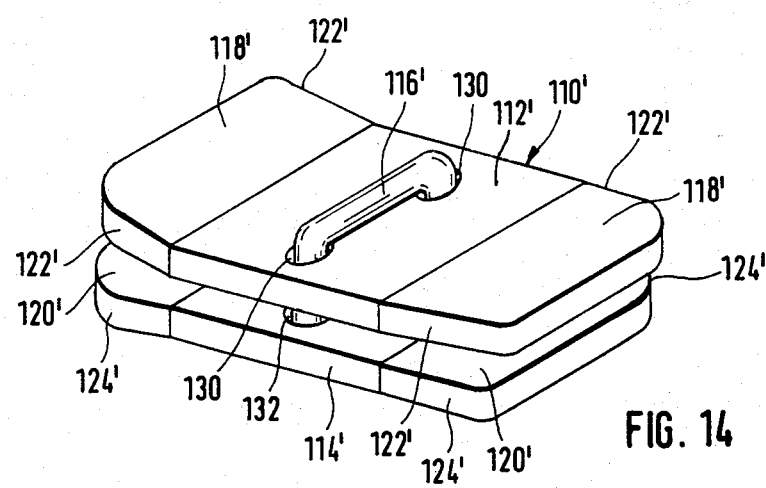
FIG. 14
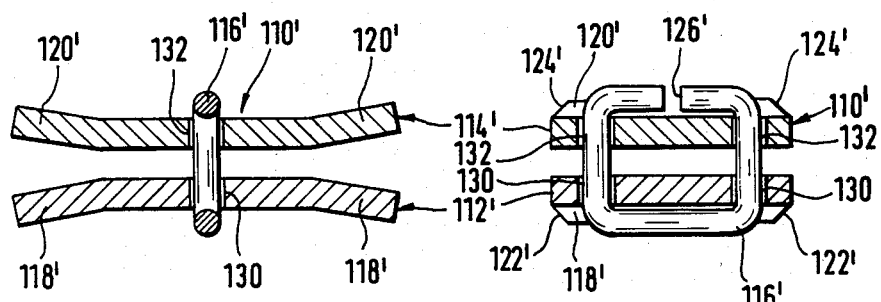
FIG. 16
FIG. 17
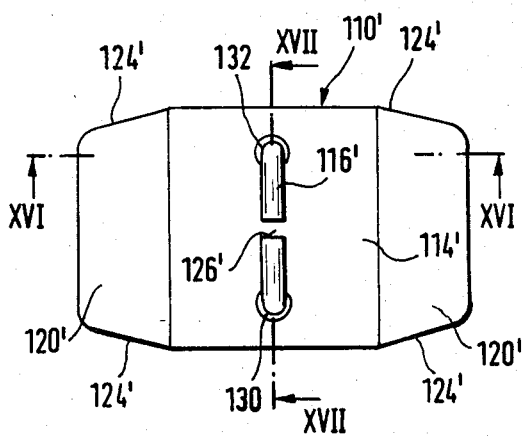
FIG. 15

FLANGED RING FOR TUBES

The invention is based on a one-piece flanged ring that can be mounted on a thin-walled, round sheet-metal tube, in order to produce a butt joint between two tube sections. It has an approximately radially outwardly protruding securing flange and an arm projecting from the inner end of the securing flange.

Various flanged rings of this type are already known, which have at least one ring land snapped into the outside of the tube and usually have in addition an abutment element resting on the inside of the tube opposite the snapped-in ring land. These known flanged rings are therefore relatively complicated in embodiment. The tension between the ring land and the abutment element requires great stability and thus means that more material is used, and it is not entirely simple to insert one tube end between the parts of the flanged ring resting against the outside and inside of the tube, especially because as a rule, thin-walled sheet-metal tubes do not have an absolutely uniform circular cross section. Furthermore, thin-walled sheet-metal tubes, such as those used in ventilating conduits, are predominantly manufactured in the form of inexpensive spiral-seam tubes made up of helically wound sheet-metal strips; the sheet-metal strips are interconnected by means of lock seams, which stand out from the outer jacket face. These lock seams prevent the insertion of the tube end into a known flanged ring.

The object of the invention is to create a flanged ring for thin-walled sheet-metal tubes which is substantially simpler in embodiment than the known flanged rings, requires less expenditure of material and can be applied to the end of the tube in a particularly simple and stable manner.

This object is attained in accordance with the invention by means of a ring land bent outward obliquely by the arm toward the securing flange; the arm and the ring land are drivable with pre-stressing into the interior of the tube.

Since the flanged ring in accordance with the invention rests only on the inside of the tube, it can be inserted into the tube much more simply, even if the tube is not perfectly round. By driving the arm with the ring land into the interior of the tube, the tube is placed under stress from the inside out, thus automatically being provided with the desired circular contour. This is a particularly advantageous feature in a thin-walled sheet-metal tube. The stability of the joint of the flanged ring with the tube is extraordinarily strong, since the force of the tensioning ring acts from the inside outward and the sheet-metal tube is under tensile stress rather than under pressure as is the case in known flanged rings. Particularly in the case of spiral-seam tubes, the lock seam on the outside of the tube no longer hinders the insertion of the flanged ring according to the invention, which rests only on the inside.

The largest diameter of the arm is preferably smaller, and the largest diameter of the ring land in the unstressed state is preferably larger, than the inner diameter of the tube onto which the flanged ring is to be mounted. As a result, the end of the arm on which the ring land is seated can be inserted more easily into the interior of the tube, and during the following process of driving in the ring land, which is efficaciously effected by hammering, the largest diameter of the ring land is reduced, thus placing the ring land under initial stressing.

The arm is efficaciously disposed to protrude approximately perpendicularly from the radial securing flange, and the ring land is bent back at an acute angle by the arm toward the securing flange. The stability attained when the flanged ring is driven into the tube depends substantially on the properties of the ring land, such as the thickness of the sheet metal, the width, the angle of obliquity with respect to the arm, and its maximum diameter with respect to the tube, and thus this stability can be varied arbitrarily by freely selecting these parameters.

In a preferred form of embodiment, the arm has a centering arm bent back approximately parallel to itself and supporting the ring land; the ring land is actually located on the end of this centering arm. The centering arm, which extends approximately parallel to the inner wall of the tube but has a smaller diameter, makes it substantially easier to begin inserting the flanged ring by hand into the end of the tube, which may under some circumstances be not quite round. By the suitable selection of the diameter of this centering arm, it can be attained that the flanged ring will adhere well, after the insertion of the centering arm, to the tube and it will then be possible to hammer the ring land into place without difficulty.

In producing a butt joint between two tube sections by means of the flanged ring according to the invention, the two securing flanges which protrude approximately radially outward can be fixed firmly to one another in any desired conventional manner, such as by means of a screw connection, clamps or the like; a sealing ring is efficaciously placed between the securing flanges. Since because of the intended initial stressing, good sealing is attained between the outer rim of the ring land and the inner wall of the tube, this form of sealing is sufficient.

In a preferred form of embodiment, however, the securing flange has a tensioning element on its outer end which is bent toward the same axial side as the arm by an angle greater than 90°. The tensioning elements of flanged rings which abut one another can then be held together by a tensioning ring common to both or by suitably shaped clamps.

In order to simplify the insertion of the flanged ring according to the invention into the end of the tube still further, a guide element may be provided on the inner end of the tensioning element which is bent obliquely inward toward the securing flange; the smallest diameter of this guide element, however, is larger than the outer diameter of of the tube, so that it does not rest on the tube; instead, the guide element serves only to simplify the introduction of the flanged ring into the tube.

A particularly advantageous form of embodiment of the flanged ring according to the invention includes an axial slit. This axial slit enables an easy adaptation of the diameter of the flanged ring to the diameter of a given tube. If the original diameter of the flanged ring is too large, then the ring can be shortened in a very simple manner on one side of the slit by cutting off a segment parallel to the wall of the slit and the diameter can be reduced by compression of the flanged ring. On the other hand, the diameter of the flanged ring can be suitably adapted by spreading apart the slit and inserting a contoured spacer element.

The invention furthermore relates to a very simple and efficacious method for producing the flanged ring according to the invention. In this method, an elongated sheet-metal strip, the length of which corresponds approximately to the circumference of the flanged ring to be produced, is contoured and then bent into an annular shape. The result is necessarily a flanged ring having an axial slit, which has the advantageous properties discussed above.

The invention also relates to a butt joint having two flanged rings; the two securing flanges, with a sealing ring placed between them, are firmly held against one another by securing means such as screws or the like. In a preferred form of embodiment of this butt joint, two flanged rings are used which have an axial slit and have curved tensioning elements such as those discussed above on the outer ends of the securing flanges. The two flanged rings are efficaciously fixed relative to one another because of the positive engagement of a tensioning ring, the inside face of which is adapted approximately to the shape of the two tensioning elements, with the outside of the two tensioning elements on which it rests. The tensioning ring preferably has an axial slit, and the curved ends resting on the slit are tightened by a screw or by a tensioning lock such that a desired axial pressure is exerted upon the tensioning elements.

The fixation of the flanged rings to the ends of the sheet-metal tube sections by the spreading force exerted by the ring lands, which dig slightly into the material comprising the sheet-metal tubes, is normally sufficiently stable. However, in specific applications if it is desired that still greater reliability be attained for the fixation of the flanged rings in the tube ends, then a further embodiment of the invention provides that protrusions can be disposed on the inside of the end of each sheet-metal tube section, and the outer edge of a given ring land is supported on these protrusions. The protrusions can be realized simply, in the form of toes or tabs pressed inwardly out of the sheet metal comprising the tube sections, or of hollow rivets or the like inserted into the wall of the tube, for example.

It is noted that the flanged ring according to the invention can not only be produced extremely simply and disposed on a tube end in an extremely efficacious and stable manner; it also results in a joint which is attractive in appearance, because only the securing flanges located on the outside, or perhaps even only the tensioning ring covering the securing flanges, can be seen from the outside. The flanged ring according to the invention, because of its shape, is comfortable and easy to handle even in manual operations, and it can be driven into the tube end very rapidly and simply, merely with the use of a hammer and in particular without requiring machines or special tools; on construction sites, this is an advantage that can hardly be overestimated. The outer diameter and the initial stressing of the flanged ring can be varied by very simple means, sometimes even at the construction site itself. Particularly in the case of a flanged ring having an axial slit, the reduction in diameter by means of shortening mentioned above can be performed quite simply with an iron saw. On the other hand, if the diameter is too small, then the slit can be enlarged in an equally simple manner and a spacer piece inserted into it.

Hammering of the flanged ring onto the tube end is efficaciously effected such that first the portion containing the slit is driven into the tube, and then hammering is performed in both directions working away from the slit.

The ring land resting on the inside with initial stressing not only imparts a circular form to the thin-walled sheet-metal tube but lends rigidity as well. Because of the contoured round shape of the flanged ring according to the invention, the material making up the flanged ring itself does not need to be particularly thick in order to attain the desired rigidity, so that the consumption of material is relatively low. Production of the flanged ring from galvanized strips of sheet metal by contouring them and bending them into a curve can be accomplished fully automatically by means of very simple machines. The tensioning ring holding together one butt joint can also be produced in a similar manner.

The form of embodiment of the flanged ring which contains an axial slit is very advantageous, not only because of the ease with which the diameter of the flanged ring can be adapted to a given tube diameter but also because of the ease with which it can be produced from an elongated strip of sheet metal. However, it has been demonstrated that firm seating of the flanged ring in the end of the tube cannot be assured with sufficient reliability and for every thickness of flanged ring, unless the two ends of the flanged ring adjacent to the slit are pressed against one another in the course of driving the ring into the tube; that is, the width of the slit must become zero. On the other hand, if the ends of the flanged ring are pressed against one another, then it can happen that the end faces of the two ends of the flanged ring will not remain resting congruently against one another but will instead slip out of position relative to one another in the radial and/or axial direction. The consequences of such a slippage are extremely disadvantageous, because the ring flange then loses its hold on the tube.

This problem is eliminated in a further embodiment of the invention by the provision that in order to fix the flanged ring ends adjacent to the axial slit relative to one another, a clamp common to both is mounted from the direction of the slit onto both ends in a frictionally engaged manner.

Before the flanged ring is driven into the tube, the clamp needs merely to be placed loosely onto the two ends of the flanged ring; because of the radial forces exerted onto the flanged ring when it is driven into the tube, the clamp is pressed into its final position in which it firmly holds the ends of the flanged ring in place.

For reasons of space and because of the fact that the radial forces are strongest there, the clamp is preferably mounted onto the two ends, adjacent to the slit, of the arm of the flanged ring disposed in the interior of the tube.

In an advantageous embodiment, the clamp has an upper part, which comes to rest on the face of the ends of the arms oriented toward the tube, and a lower part, which comes to rest on the face of the ends of the arms pointing away from the tube. The upper and lower parts are embodied in the form of plates or tabs, and they exert pressure on the adjacent faces of the ends of the flanged ring.

In order to reinforce the mutual fixation of the flanged ring ends in the axial direction still further, a preferred form of embodiment of the clamp provides that the upper and lower parts are interconnected by means of narrow ribs extending perpendicular to them; when the arm and the ring land are driven into the tube, these ribs force their way into the end faces of the ends of the arm adjacent to the slit, forming grooves in these faces.

The radial forces thereby exerted onto the flanged ring press the two ends of the flanged ring located at the slit together so strongly that the ribs are automatically forced into the end faces of the flanged ring ends. As a result, a supplementary, reliable fixation of the flanged ring ends in the axial direction of the tube is attained.

In order to make it easier to insert the ends of the flanged ring into the clamp, the upper and lower parts have end sections which, in an advantageous embodiment, diverge in both mounting directions. In addition, the divergent end sections may have slanted areas extending laterally inward, in order to simplify insertion in the axial direction as well.

The production of the clamp is efficaciously accomplished by stamping and bending of a one-piece sheet-metal element; the upper or the lower part has an interruption perpendicular to the slit.

In order to attain sufficient rigidity and clamping force on the part of the clamp, an advantageous form of embodiment provides that the clamp is produced from a sheet of spring steel.

Spring steel is relatively difficult to work, and as a material it is also more expensive than normal sheet steel. It is therefore provided in an efficacious form of embodiment that the upper part and the lower part are produced separately, of conventional sheet steel, and are then held together by a spring steel bracket, which is guided by two overlapping holes each in the upper and lower parts and rests on the outer faces of the upper and the lower part. As a result, the two elements made of the less-expensive material are held firmly together by a one-piece bracket of spring steel, which is effortlessly capable of withstanding the stresses placed upon it.

The spring steel bracket is generally C-shaped in embodiment, and the interruption in the spring steel bracket, which is bent into a curve from a single piece, is efficaciously located approximately in the middle of the outer face of the lower part.

Figure 1:
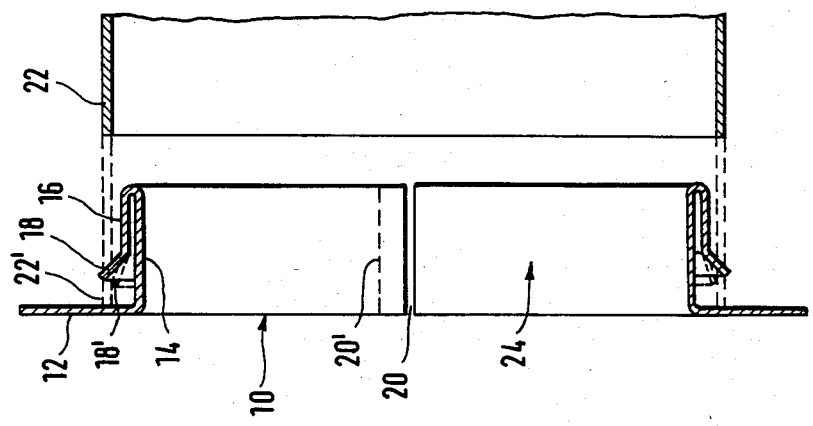
Figure 5:
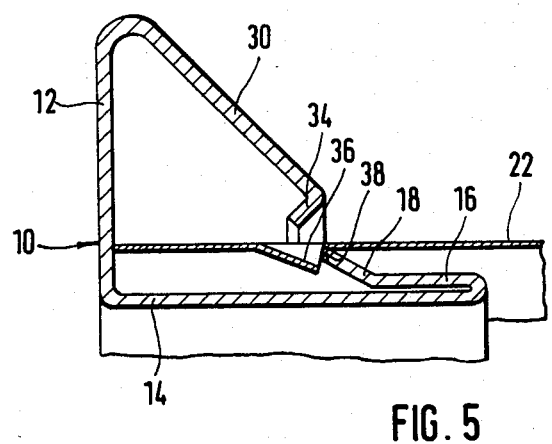
Figure 6:
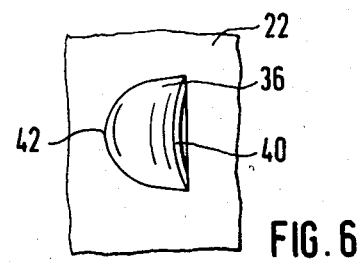
Figure 8:
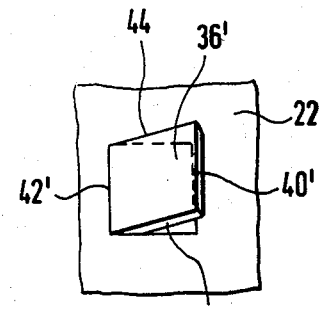
Figure 7:
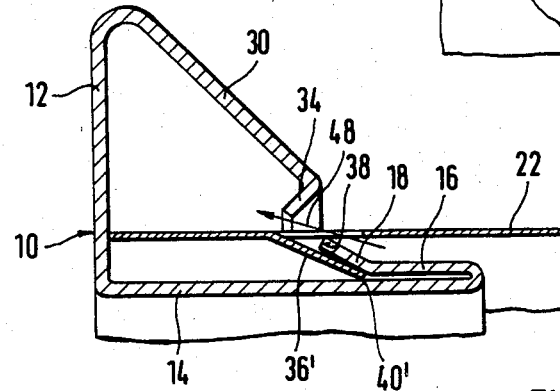
Figure 9:
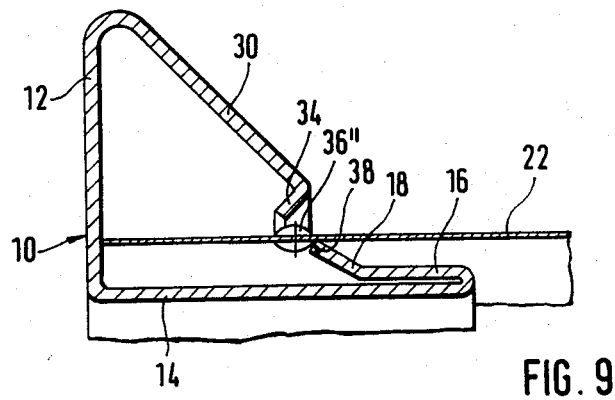
Figure 10:
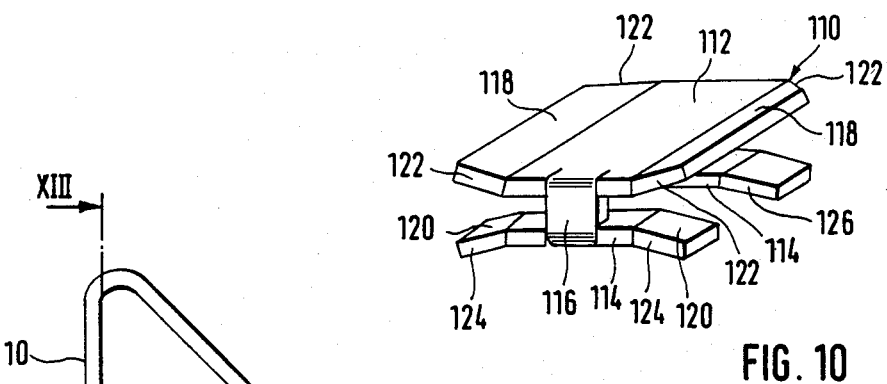
Figure 11:
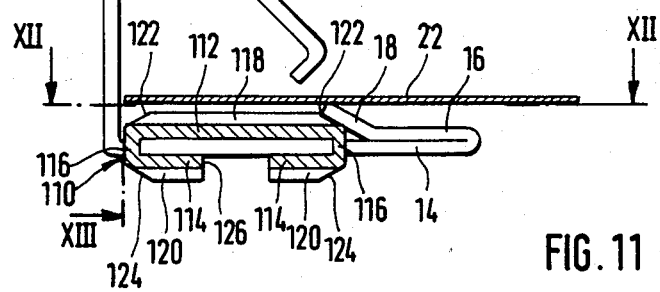
Figure 12:
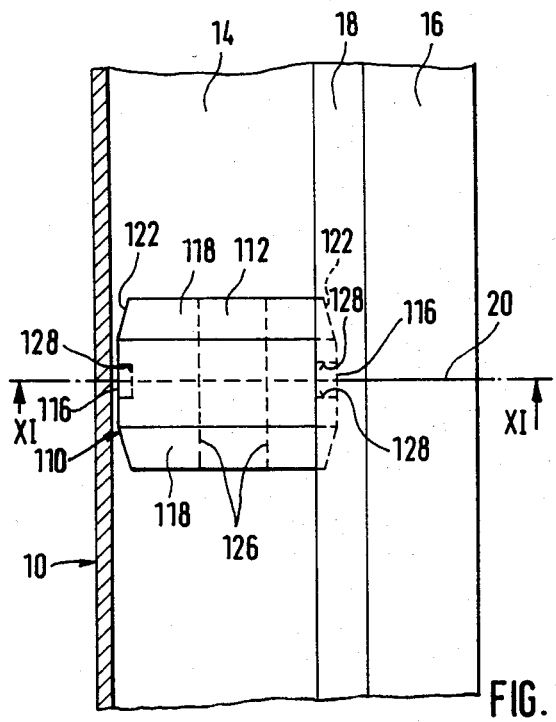
Figure 13:
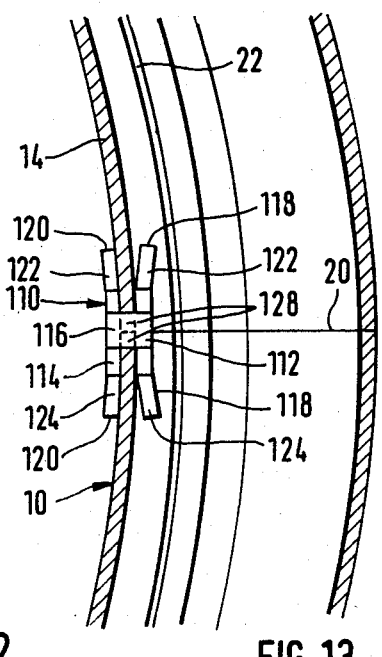

Exemplary embodiments of the invention will now be described in greater detail, referring to the drawings. Shown are:

FIG. 1, an axial section taken through a first form of embodiment of the flanged ring according to the invention, in the unstressed state, with the adjoining end of the tube;

FIG. 2, an axial section taken through a butt joint, having two flanged rings as shown in FIG. 1, between two tube ends;

FIGS. 3 and 4, axial sections corresponding to FIG. 2 taken through butt joints which contain a second and third form of embodiment, respectively, of the flanged ring according to the invention;

FIG. 5, an axial section taken through part of the flanged ring mounted onto the tube, having a securing toe pressed out of the sheet metal of the end of the tube;

FIG. 6, an oblique view of the securing toe;

FIG. 7, a partial section corresponding to FIG. 5 having a securing toe pressed out of the sheet metal of the end of the tube;

FIG. 8, an oblique view of the securing toe;

FIG. 9, a partial section corresponding to FIGS. 5 and 7 having a securing rivet fastened to the tube end;

FIG. 10, an oblique view of a first form of embodiment of a clamp which is mounted onto the axial ends of the flanged ring;

FIG. 11, an axial partial section taken through the flanged ring mounted on the tube, with the clamp in the mounted position, taken along the line XI—XI of FIG. 12;

FIG. 12, a partial section taken along the line XII—XII of FIG. 11;

FIG. 13, a partial section taken along the line XIII—XIII of FIG. 11;

FIG. 14, an oblique view, corresponding to FIG. 10, of a second form of embodiment of the clamp;

FIG. 15, a bottom view of the clamp shown in FIG. 14;

FIG. 16, a section taken along the line XVI—XVI of FIG. 15; and

FIG. 17, a section taken along the line XVII—XVII of FIG. 15.

The flanged ring generally identified by reference numeral 10 in FIG. 1 has a radial securing flange 12; an arm 14 extending approximately at right angles thereto and thus extending approximately axially; a centering arm 16 bent back approximately parallel to the arm 14; a ring land 18 bent obliquely outward by the centering arm 16 toward the securing flange; and an axial slit 20. In the unstressed state of the flanged ring 10 indicated by solid lines in FIG. 1, the largest diameter of the ring land 18 is larger than the inside diameter of the tube 22, into which the flanged ring 10 is to be driven. The dashed lines in FIG. 1 show how the tube 22' deforms the ring land 18' and thereby pre-stresses it, so that by hammering the flanged ring 10 onto the tube 22 in the direction of the arrow 24, an extraordinarily stable joint is produced between the flanged ring 10 and the tube 22.

In attaching the flanged ring 10 to the end of the tube 22, at first merely the centering arm 16 can be inserted by hand into the interior of the tube. By the suitable selection of the diameter, which can be accomplished by shortening the flanged ring 10 parallel to the slit 20, for instance along the line 20', or by spreading apart the slit 20 and inserting a spacer element into it, it can be attained in a very simple manner that the centering flange 16 adheres to the inside of the tube end. The flanged ring 10 is then hammered completely into the end of the tube 22 in the direction of the arrow 24, the hammering operation beginning in the vicinity of the slit 20 and then continuing to both sides in the circumferential direction of the flanged ring 10, until the area of the flanged ring located radially opposite the slit 20 is attained. The ring land 18 bends under the prestressing into the flatter shape 18' shown in dashed lines in FIG. 1, its outer rim spreading against the inside of the tube 22 as a result.

In all the drawing figures, the same reference numerals as in FIG. 1 are used for identical or corresponding elements.

In the butt joint of two thin-walled sheet-metal tubes 22 shown in FIG. 2, two flanged rings 10 as shown in FIG. 1 are used; a sealing ring 26 is disposed between the two securing flanges 12. Screw connections indicated by dot-dash lines 28 hold the two securing flanges 12 together, compressing the sealing ring 26.

In the butt joint shown in FIG. 3, the securing flanges 12 of the flanged rings 10 have a tensioning element 30 on their outer ends which is bent by an angle of more than 90° toward the same axial side as the arm 14. The outer sides of the tensioning element 30 are encompassed by a separate tensioning ring 32 which in profile is symmetrically curved and rests in a positively engaged manner on the outer sides of the tensioning elements 30. The positive engagement may be effected, by way of example, by means of a screw connection (not shown) or by a tensioning lock on two ends formed by an axial slit. The result is a firm connection between the two flanged rings which can be both produced and assembled in a simple manner.

The butt joint according to FIG. 4 corresponds substantially to what is shown in FIG. 3. However, FIG. 4 additionally shows guide elements 34 bent obliquely inward toward the securing flanges 12 on the inner ends of the tensioning elements 30; the guide elements 34 terminate at a distance from the outer wall of the tubes 22. These guide elements 34 have the sole function of simplifying the introduction of the flanged rings 10 into the end of the tubes 22.

In FIGS. 5-9, exemplary embodiments are shown of protrusions on the inside of the tube ends, which in particular forms of embodiment effect a supplementary securing of the flanged rings which otherwise, under normal stress, sit firmly in the ends of the tubes without additional aid. In the form of embodiment shown in FIGS. 5 and 6, the protrusions are embodied as round toes 36 pressed inward from the sheet-metal wall of the tube end 22; the upper, inner ends 40 of the toes 36, which come to rest on the outer edge 38 of the ring land 18, are cut away from the sheet-metal wall adjacent to them on the inside, while the outer, lower ends 42 of the toes 36 merge with and are coherent with the sheet-metal wall of the tube 22. Although only one toe 36 is shown in FIG. 5, it is nevertheless clear that a plurality of such toes 36 may be provided all around the circumference of the end of the tube 22. Because the edge 38 of the ring land 18 rests on the inner ends 40 of the toes 36, an extraordinarily secure and air-tight fixation of the flanged ring 10 in the tube end 22 is produced.

The form of embodiment shown in FIGS. 7 and 8 differs from the previous embodiment solely in that instead of the round toes 36, of which only the forward edge 40 is cut away from the wall of the tube 22, rectangular tabs 36' are pressed out of the wall of the tube section 22 in this embodiment; the tabs 36' are cut away not only on the inner edge 40' but also on the two lateral edges 44 and 46 from the surrounding wall of the sheet-metal tube section 22. They cohere with the wall of the tube section 22 solely along the outer rim 42' and protrude obliquely inward from this rim. The outer edge 38 of the ring land 18, in this form of embodiment, is suspended directly on the inner edge 40' of the tabs 36', so that the flanged ring 10 is still better secured against slippage out of position than is the case in the form of embodiment having the toes as shown in FIGS. 5 and 6. On the other hand, it must be taken into consideration that in the embodiment of FIG. 7 the sealing of the tube wall is not quite as good, since some air can flow out of the tube in the direction of the arrow 48. This latter embodiment can therefore be used only if this slight escape of air is acceptable.

A very simple further form of embodiment of an additional fixation is shown in FIG. 9 in the form of a hollow rivet 36" inserted into the end of the tube section 22; the outer edge 38 of the ring land 18 is supported on this hollow rivet. Here, again, although only one hollow rivet 36" is shown, it is naturally possible to provide a plurality of hollow rivets all around the circumference of the sheet-metal tube section 22.

In FIGS. 10-17, two exemplary embodiments of a clamp for fixing the flanged ring ends adjacent to the axial slit are shown. The first form of embodiment of this clamp shown in FIGS. 10-13 is bent in one piece from a sheet of spring steel.

The clamp, generally identified as 110, has an upper part 112 and a lower part 114. The upper part 112 and lower part 114 are interconnected by narrow ribs 116 seated on their end faces. In order to simplify the insertion of the ends of the flanged ring 10 between the upper part 112 and lower part 114, the upper and lower parts have respective end sections 118 and 120 diverging away from one another. Each end section 118 and 120 has a lateral slanted area 122 and 124, respectively, which slant inward and simplify the mounting of the clamp 110 onto the ends of the flanged ring.

The lower part 114 of the clamp 110 has an interruption 126, because the entire clamp 110 is produced in one piece by stamping and bending from a single strip of sheet metal. The lower part 114 therefore comprises two parts located opposite one another, the clamping force of which in the radial direction of the flanged ring is not, however, impaired by the interruption 126. In the axial direction, the lower part 114 is not under pressure or tension.

In the manner seen in FIGS. 2-4, the clamp 110 is pressed onto the ends of the arm 14 at either side of the slit 20 in a frictionally engaged manner, after the flanged ring 10 has been driven into the end of the thin-walled, round sheet-metal tube 22; the original distance between the upper part 112 and the lower part 114 in the middle portion, that is, the non-divergent portion, is now somewhat less than the thickness of the arm 14. Pressing the clamp 110 onto the ends of the arm 14 spreads the arm somewhat apart in a yielding manner, so that the arm 14 is seated firmly in a frictional seating upon the arm 14.

At the same time, as the flanged ring 10 is driven into the tube 22, the slit 20 closes to form a seam as a result of the radial force exerted by the tube 22 via the ring land 18 and the centering arm 16; the ends of the flanged ring 10 are thereby pressed firmly together. The upright ribs 116 are thus forced into the two ends of the arm 14, forming grooves 128, and the ends are thereby anchored relative to one another and prevented from slipping in the axial direction. The two flanged ring ends along the slit 20 are thus reliably fixed in position relative to one another both in the radial and in the axial direction.

The second form of embodiment of the clamp 110' shown in FIGS. 14-17 comprises an upper part 112' and an opposed lower part 114', which are each made of normal sheet steel. The upper and lower parts have respective end sections 118' and 120' diverging from one another, in order to simplify the insertion of the ends of the flanged ring (not shown). Each end section 118' and 120', respectively, has a slanted area 122' and 124' for further simplifying the mounting of the clamp 110'. In this form of embodiment, the upper part 112' and the lower part 114' are held together by a spring steel bracket 116' bent at approximately right angles, which is guided by two overlapping holes 130 and 132 each in the upper part 112' and the lower part 114', respectively, and rests on the outer faces of the upper and lower parts. The interruption 126' in the curved, one-piece spring steel bracket 116' is located approximately in the middle of the lower part 114'.

Since the ends (not shown) of the flanged ring are inserted between the upper part 112' and the lower part 114', the upper and lower parts are held approximately in the position shown in the drawings by frictional engagement with the flanged ring; an inwardly-directed pressure is exerted by the spring steel bracket 116', which fixes the ends of the flanged ring in position against one another. Slippage of the ends in the axial direction of the flanged ring is additionally prevented by the penetration of the sections of the spring steel bracket 116', located between the upper part 112' and the lower part 114', into the edges resting on the axial slit of the flanged ring. Grooves corresponding to the grooves 128 of FIGS. 12 and 13 are formed in this embodiment as well in the course of hammering the flanged ring into the end of the sheet-metal tube section.

I claim:

1. A one-piece flanged ring which can be mounted on a thin-walled, round sheet-metal tube, for making a butt joint between two tube sections, having an approximately radially outwardly protruding securing flange and an arm projecting from the inner end of the securing flange, characterized by a ring land (18) bent obliquely outward toward the securing flange (12) by the arm (14), the arm (14) and the ring land (18) being drivable with pre-stressing into the interior of the tube, wherein the largest diameter of the arm (14) is smaller, and the largest diameter of the ring land (18) in the unstressed state is larger, than the inside diameter of the tube (22), wherein the arm (14) projects approximately perpendicularly from the securing flange (12), and wherein the arm (14) has a centering arm (16) bent back approximately parallel to itself and supporting the ring land (18).

2. A flanged ring as defined by claim 1, characterized in that on its outer end the securing flange (12) has a tensioning element (30) bent back by more than 90° toward the same axial side as the arm (14).

3. A flanged ring as defined by claim 1 characterized in that a guide element (34) bent obliquely inward toward the securing flange (12) is provided on the inner end of the tensioning element (30).

4. A flanged ring as defined by claim 1, characterized in that flanged ring (10) includes an axial slit (20).

5. A method for producing the flanged ring as defined by claim 1, characterized in that an elongated sheet-metal strip is contoured and subsequently bent into annular form.

6. A butt joint between two thin-walled, round sheet-metal tube sections having two flanged rings as defined by claim 3, characterized in that the two securing flanges (12), with a sealing ring (26) placed between them, are placed firmly against one another by securing means (28, 32).

7. A butt joint as defined by claim 3, characterized in that a tensioning ring (32) rests in a positively-engaged manner on the outside of the two tensioning elements (30).

8. A butt joint defined by claim 7, characterized in that protrusions (36, 36', 36") are provided on the inside of the end of each sheet-metal tube section (22), the outer edge (38) of the associated ring land (18) resting on the respective protrusions (36, 36', 36").

9. A flanged ring as defined by claim 4, characterized in that for the fixation relative to one another of the ends of the flanged ring (10) adjacent to the axial slit (20), a common clamp (110) is mounted on both ends, beginning at the slit (20), in a frictionally engaged manner.

10. A flanged ring as defined by claim 9, characterized in that the clamp (110) can be mounted onto both ends of the arm (14) adjacent to the slit (20).

11. A flanged ring as defined by claim 10, characterized in that the clamp (110) has an upper part (112) which comes to rest on the face of the ends of the arm (14) oriented toward the tube (22) and a lower part (114) which comes to rest on the face of the ends of the arm (14) pointing away from the tube (22).

12. A flanged ring as defined by claim 11, characterized in that the upper part (112) and lower part (114) are connected with one another by means of narrow ribs (116, 116') extending perpendicularly thereto, which when the arm (14) and ring land (18) are driven into the tube (22) penetrate the end faces of the ends of the arm (14) adjacent to the slit (20), forming grooves (128).

13. A flanged ring as defined by claim 12, characterized in that, for easier insertion of the ends of the flanged ring (10), the upper and lower parts (112, 114) have end sections (118, 120) diverging in the two mounting directions.

14. A flanged ring as defined by claim 13, characterized in that the diverging end sections (118, 120) have slanted areas (122, 124) extending laterally toward the inside.

15. A flanged ring as defined by one of the claim 14, characterized in that the clamp (110) comprises a one-piece sheet-metal element, and the upper part or lower part (112 or 114) has an interruption (126) perpendicular to the slit (20).

16. A flanged ring as defined by one of the claim 15, characterized in that the clamp (110) is produced of sheet spring steel.

17. A flanged ring as defined by claim 14, characterized in that the upper part (112') and lower part (114') are held together by a spring steel bracket, which is guided by two overlapping holes each on the upper part (112') and lower part (114') and rests on the outer faces of the upper part (112') and lower part (114').

18. A flanged ring as defined by claim 17, characterized in that the spring steel bracket is embodied generally in the form of a C and that the interruption (126') of the spring steel bracket is located approximately in the middle of the outer face of the lower part (114').

19. A flanged ring for tubes, comprising an annular arm having peripheral rims and further having an axial slit formed therein, a securing flange on one rim of the arm and projecting radially therefrom, an annular centering arm on the other rim, the arm having a portion bent back over itself approximately parallel and in spaced relationship thereto, and land means on the end of the bent back portion of the centering arm and projecting upwardly and outwardly therefrom; the arrangement being such that if the diameter of the ring is too large for a given tube, the ring may be made smaller by cutting off a segment of the annular arm substantially parallel to the slit; and if the diameter of the ring is too small for a given tube, the annular ring may be spread apart and a spacer element inserted within the slit, whereby in either case the ring may be compressed and inserted into the end of the tube and stressed therein to retain the ring to the tube.

* * * * *